US008538902B2

(12) United States Patent
Taguchi

(10) Patent No.: US 8,538,902 B2
(45) Date of Patent: Sep. 17, 2013

(54) BEHAVIOR PREDICTING DEVICE THAT PREDICTS THE BEHAVIOR OF AN OBJECT BASED ON CHARACTERISTIC VALUES OF THE OBJECT

(75) Inventor: Koji Taguchi, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 664 days.

(21) Appl. No.: 12/674,282

(22) PCT Filed: Aug. 27, 2008

(86) PCT No.: PCT/JP2008/065310
§ 371 (c)(1),
(2), (4) Date: Feb. 19, 2010

(87) PCT Pub. No.: WO2009/028558
PCT Pub. Date: Mar. 5, 2009

(65) Prior Publication Data

US 2010/0205132 A1 Aug. 12, 2010

(30) Foreign Application Priority Data

Aug. 27, 2007 (JP) ................................ 2007-220011

(51) Int. Cl.

| | |
|---|---|
| ***G06F 17/00*** | (2006.01) |
| ***G06F 17/10*** | (2006.01) |
| ***G06N 5/02*** | (2006.01) |
| ***G06G 7/78*** | (2006.01) |
| ***G08G 1/16*** | (2006.01) |

(52) U.S. Cl.
USPC .............................................. 706/46; 701/301

(58) Field of Classification Search
None
See application file for complete search history.

(56) References Cited

U.S. PATENT DOCUMENTS

| | | | | |
|---|---|---|---|---|
| 7,671,725 | B2 * | 3/2010 | Tsuji et al. | 340/435 |
| 7,788,027 | B2 * | 8/2010 | Jones | 701/519 |
| 8,140,210 | B2 * | 3/2012 | Randler et al. | 701/27 |
| 2010/0010699 | A1 | 1/2010 | Taguchi et al. | |

FOREIGN PATENT DOCUMENTS

| | | |
|---|---|---|
| JP | A-10-105885 | 4/1998 |
| JP | A-2002-074595 | 3/2002 |
| JP | A-2002-260192 | 9/2002 |
| JP | A-2003-081039 | 3/2003 |

(Continued)

OTHER PUBLICATIONS

Seiki, Taguchi. "Object-Detecting Device for Vehicles." JP2006039698 (2006).*

(Continued)

*Primary Examiner* — Kakali Chaki
*Assistant Examiner* — Daniel Pellett
(74) *Attorney, Agent, or Firm* — Oliff & Berridge, PLC

(57) ABSTRACT

A characteristic value temporary setting section temporarily sets a characteristic value of an object depending on the type of the object judged by a type judging section. A characteristic value correcting section corrects the temporarily set characteristic value of the object according to the behavior of the object detected by a behavior detecting section. A type setting section sets the type of object as one of a motorcycle, a bicycle, and a pedestrian according to the corrected characteristic value of the object. A behavior predicting section predicts the behavior of the object on the basis of the corrected characteristic value and the set type of the object. Therefore, the behavior is predicted on the basis of the characteristic value corrected according to the actual behavior and the type of the object, and consequently, the accuracy of the behavior prediction is improved.

7 Claims, 5 Drawing Sheets

(56) References Cited

FOREIGN PATENT DOCUMENTS

| | | |
|---|---|---|
| JP | A-2005-311691 | 11/2005 |
| JP | A-2006-039698 | 2/2006 |
| JP | A-2007-026327 | 2/2007 |
| JP | A-2007-058751 | 3/2007 |
| JP | A-2008-117082 | 5/2008 |
| JP | A-2008-234593 | 10/2008 |

OTHER PUBLICATIONS

Abramson, Y.; Steux, B.; , "Hardware-friendly pedestrian detection and impact prediction," Intelligent Vehicles Symposium, 2004 IEEE , vol., no., pp. 590-595, Jun. 14-17, 2004.*

Gandhi, T.; Trivedi, M.M.; , "Pedestrian collision avoidance systems: a survey of computer vision based recent studies," Intelligent Transportation Systems Conference, 2006. ITSC '06. IEEE , vol., no., pp. 976-981, Sep. 17-20, 2006.*

Gavrila, D.M.; Philomin, V.; , "Real-time object detection for "smart" vehicles," Computer Vision, 1999. The Proceedings of the Seventh IEEE International Conference on , vol. 1, no., pp. 87-93 vol. 1, 1999.*

Wakim, C.F.; Capperon, S.; Oksman, J.; , "A Markovian model of pedestrian behavior," Systems, Man and Cybernetics, 2004 IEEE International Conference on , vol. 4, no., pp. 4028-4033 vol. 4, Oct. 10-13, 2004.*

International Search Report issued in International Patent Application No. PCT/JP2008/065310 mailed Oct. 14, 2008 (with translation).

* cited by examiner

BEHAVIOR PREDICTING DEVICE THAT PREDICTS THE BEHAVIOR OF AN OBJECT BASED ON CHARACTERISTIC VALUES OF THE OBJECT

TECHNICAL FIELD

The present invention relates to a behavior predicting device, and more particularly, to a behavior predicting device that predicts the behavior of an object around a vehicle.

BACKGROUND ART

A technique has been proposed which automatically drives a vehicle. For example, Patent Citation 1 discloses an automatically driven vehicle that is automatically driven on the road to a destination set on a road map according to a predetermined driving plan while detecting its position on the road map. The automatically driven vehicle includes a unit that notifies the operation to be performed according to the next driving plan to a driver or a unit that receives information about the position of other vehicles that are automatically driven around the vehicle and the driving plan thereof by vehicle-to-vehicle communication and notifies the operations of other vehicles to be performed according to the next driving plan to the driver of the vehicle. In this way, it is possible to prevent the driver from feeling unease or discomfort due to the unexpected operations of the driver's own vehicle that is automatically driven or other vehicles around the vehicle.

[Patent Citation 1] JP-A-10-105885

DISCLOSURE OF INVENTION

Technical Problem

However, basically, the above-mentioned technique is applied only to a travelling vehicle so as to keep its lane. Therefore, in an environment in which there are, for example, motorcycles, bicycles, and pedestrians, it is difficult to generate the most suitable driving plan for the automatically driven vehicle. In particular, it is difficult to accurately determine the type of motorcycle, bicycle, or pedestrian or to accurately predict the behavior thereof. Therefore, a technique is required which is capable of accurately predicting the behavior of the motorcycle, the bicycle, and the pedestrian.

The invention has been made in order to solve the above-mentioned problems, and an object of the invention is to provide a behavior predicting device capable of improving the accuracy of predicting the behavior of a motorcycle, a bicycle, and a pedestrian around a vehicle.

Technical Solution

According an aspect of the invention, a behavior predicting device includes: a type determining unit that determines whether an object around a vehicle is a motorcycle, a bicycle, or a pedestrian; a characteristic value temporary setting unit that temporarily sets characteristic values of the object on the basis of the type of object determined by the type determining unit; a behavior detecting unit that detects the behavior of the object; a characteristic value correcting unit that corrects the characteristic values of the object temporarily set by the characteristic value temporary setting unit on the basis of the behavior of the object detected by the behavior detecting unit; a type setting unit that sets whether the object is the motorcycle, the bicycle, or the pedestrian on the basis of the characteristic values of the object corrected by the characteristic value correcting unit; and a behavior predicting unit that predicts the behavior of the object on the basis of at least one of the characteristic values of the object corrected by the characteristic value correcting unit and the type of object set by the type setting unit.

According to this structure, the type determining unit determines whether an object around a vehicle is a motorcycle, a bicycle, or a pedestrian and the characteristic value temporary setting unit temporarily sets the characteristic values of the object on the basis of the type of object determined by the type determining unit. Therefore, it is possible to provisionally determine the characteristic values of the object on the basis of the type of object.

According to this structure, the behavior detecting unit detects the behavior of the object, and the characteristic value correcting unit corrects the characteristic values of the object temporarily set by the characteristic value temporary setting unit on the basis of the behavior of the object detected by the behavior detecting unit. Therefore, it is possible to improve the accuracy of the characteristic values of the object by correcting the characteristic values provisionally determined on the basis of the actual behavior of the object.

According to this structure, the type setting unit sets whether the object is a motorcycle, a bicycle, or a pedestrian on the basis of the characteristic values of the object corrected by the characteristic value correcting unit. Therefore, it is possible to improve the accuracy of the determination of the type of object.

According to this structure, the behavior predicting unit predicts the behavior of the object on the basis of at least one of the characteristic values of the object corrected by the characteristic value correcting unit and the type of object set by the type setting unit. Therefore, the behavior of the object is predicted on the basis of the characteristic values of the object corrected on the basis of the actual behavior of the object and the type of object. As a result, it is possible to improve the accuracy of the prediction of behavior.

In this case, the characteristic values of the object may include an area in which the object exists on a road, a direction change property indicating the possibility that the object will change its direction, and a road crossing property indicating the possibility that the object will move across the road.

According to this structure, the characteristic values of an object, which is any one of the motorcycle, the bicycle, and the pedestrian include the existence area, the direction change property, and the road crossing property, which are important factors for ensuring safety. Therefore, the accuracy of the prediction of behavior based on the characteristic values is improved.

In this case, the characteristic value temporary setting unit may temporarily set the existence area to at least one of three areas, that is, a central portion of a lane of the road, a side portion of the lane of the road, and a sidewalk. The characteristic value temporary setting unit may temporarily set the direction change property to at least one of three levels, that is, a high level, a middle level, and a low level. The characteristic value temporary setting unit may temporarily set the road crossing property to at least one of three levels, that is, a high level, a middle level, and a low level. When the type determining unit determines that the object is the motorcycle, the characteristic value temporary setting unit may temporarily set the existence area to the central portion of the lane of the road, the direction change property to the low level, and the road crossing property to the low level. When the type determining unit determines that the object is the bicycle, the characteristic value temporary setting unit may temporarily set the existence area to the side portion of the lane of the road and the sidewalk, the direction change property to the middle level, and the road crossing property to the middle level. When the type determining unit determines that the object is the pedestrian, the characteristic value temporary setting unit may temporarily set the existence area to the sidewalk, the direction change property to the high level, and the road crossing property to the high level.

According to this structure, the characteristic value temporary setting unit temporarily sets the existence area, the direction change property, and the road crossing property in stages. Therefore, it is possible to temporarily set the characteristic values using a simple unit.

In this case, when the object is the motorcycle, the motorcycle mainly travels through the central portion of the lane of the road. Since the motorcycle travels at a relatively high speed, the direction change property is low. In addition, the motorcycle is less likely to travel across the road. Therefore, the characteristic value temporary setting unit temporarily sets the existence area to the central portion of the lane of the road, the direction change property to the low level, and the road crossing property to the low level.

When the object is the bicycle, the bicycle mainly travels through the side portion of the lane of the road and the sidewalk. Since the speed of the bicycle is lower than that of the motorcycle, the direction change property of the bicycle is the middle level. In addition, the bicycle is more likely to move across the road than the motorcycle. Therefore, the characteristic value temporary setting unit temporarily sets the existence area to the side portion of the lane of the road and the sidewalk, the direction change property to the middle level, and the road crossing property to the middle level.

When the object is the pedestrian, the pedestrian mainly walks on the sidewalk. Since the speed of the pedestrian is low, the direction change property of the pedestrian is high. In addition, the pedestrian is more likely to move across the road. Therefore, the characteristic value temporary setting unit temporarily sets the existence area to the sidewalk, the direction change property to the high level, and the road crossing property to the high level.

In this way, the characteristic value temporary setting unit can temporarily set characteristic values suitable for the type of object determined.

In this case, when the type determining unit determines that the object is the motorcycle and the behavior detecting unit detects that the frequency of the existence of the object in the side portion of the lane of the road is more than a first threshold value, the characteristic value correcting unit may correct the existence area to the central portion and the side portion of the lane of the road.

The traveling tendency of the motorcycle is divided into two cases, that is, a case in which the driver tends to drive the motorcycle through the central portion of the lane of the road and a case in which the driver tends to drive the motorcycle through the side portion of the lane of the road. According to this structure, when the type determining unit determines that the object is the motorcycle and the behavior detecting unit detects that the frequency of the existence of the object in the side portion of the lane of the road is more than the first threshold value, that is, the motorcycle frequently travels through the side portion of the lane, the characteristic value correcting unit corrects the existence area to the central portion and the side portion of the lane of the road. Therefore, it is possible to correct the existence area, which is a characteristic value, according to the actual tendency of the motorcycle.

In a case in which the type determining unit determines that the object is the bicycle or the pedestrian, when the behavior detecting unit detects that the frequency of the existence of the object on the road is equal to or more than a second threshold value, the characteristic value correcting unit may correct the existence area to the road. When the behavior detecting unit detects that the frequency of the existence of the object on the road is equal to or less than a third threshold value less than the second threshold value, the characteristic value correcting unit may correct the existence area to the sidewalk. When the behavior detecting unit detects that the frequency of the existence of the object on the road is less than the second threshold value and more than the third threshold value, the characteristic value correcting unit may correct the existence area to the road and the sidewalk.

The tendency of the bicycle or the pedestrian is divided into two cases, that is, a case in which the bicycle or the pedestrian tends to be disposed on the road and a case in which it tends to be disposed on the sidewalk according a situation, such as crossing, or road conditions. However, according to this structure, when the type determining unit determines that the object is the bicycle or the pedestrian and the behavior detecting unit detects that the frequency of the existence of the object on the road is equal to or more than the second threshold value, that is, the bicycle or the pedestrian exists frequently on the road, the characteristic value correcting unit corrects the existence area to the road. When the behavior detecting unit detects that the frequency of the existence of the object on the road is equal to or less than the third threshold value less than the second threshold value, that is, the bicycle or the pedestrian exists less frequently on the road, the characteristic value correcting unit corrects the existence area to the sidewalk. When the behavior detecting unit detects that the frequency of the existence of the object on the road is less than the second threshold value and more than the third threshold value, that is, the frequency of the existence of the bicycle or the pedestrian on the road is the middle level, the characteristic value correcting unit corrects the existence area to the road and the sidewalk. Therefore, it is possible to correct the existence area, which is a characteristic value, according to the actual tendency of the bicycle or the pedestrian.

When the behavior detecting unit detects that the frequency of the maintenance of the traveling direction of the object within a unit time is equal to or more than a fourth threshold value, the characteristic value correcting unit may correct the direction change property to the low level. When the behavior detecting unit detects that the frequency of the maintenance of the traveling direction of the object within the unit time is equal to or less than a fifth threshold value less than the fourth threshold value, the characteristic value correcting unit may correct the direction change property to the high level. When the behavior detecting unit detects that the frequency of the maintenance of the traveling direction of the object within the unit time is less than the fourth threshold value and more than the fifth threshold value, the characteristic value correcting unit may correct the direction change property to the middle level.

According to this structure, when the behavior detecting unit detects that the frequency of the maintenance of the traveling direction of the object within the unit time is equal to or more than the fourth threshold value, that is, the frequency of changes in the direction of the object is low, the characteristic value correcting unit corrects the direction change property to the low level. When the behavior detecting unit detects that the frequency of the maintenance of the traveling direction of the object within the unit time is equal to or less than the fifth threshold value less than the fourth threshold value, that is, the frequency of changes in the direction of the object is high, the characteristic value correcting unit corrects the direction change property to the high level. When the behavior detecting unit detects that the frequency of the maintenance of the traveling direction of the object within the unit time is less than the fourth threshold value and more than the fifth threshold value, that is, the frequency of changes in the direction of the object is a middle level, the characteristic value correcting unit corrects the direction change property to the high level. Therefore, it is possible to correct the direction change property, which is a characteristic value, according to the actual tendency of an object.

When the behavior detecting unit detects that the object exists on only the road, the characteristic value correcting unit may correct the road crossing property to the low level. When the behavior detecting unit detects that the frequency of the movement of the object across the road within a unit time is equal to or more than a sixth threshold value, the characteristic value correcting unit may correct the road crossing property to the high level. When the behavior detecting unit detects that the frequency of the movement of the object across the road within the unit time is equal to or less than a seventh threshold value less than the sixth threshold value, the characteristic value correcting unit may correct the road crossing property to the low level. When the behavior detecting unit detects that the frequency of the movement of the object across the road within the unit time is less than the sixth threshold value and more than the seventh threshold value, the characteristic value correcting unit may correct the road crossing property to the middle level.

According to this structure, when the behavior detecting unit detects that the object exists on only the road, the characteristic value correcting unit corrects the road crossing property to the low level. When the behavior detecting unit detects that the frequency of the movement of the object across the road within a unit time is equal to or more than the sixth threshold value, that is, the object is more likely to move across the road, the characteristic value correcting unit corrects the road crossing property to the high level. When the behavior detecting unit detects that the frequency of the movement of the object across the road within the unit time is equal to or less than the seventh threshold value less than the sixth threshold value, that is, the object is less likely to move across the road, the characteristic value correcting unit corrects the road crossing property to the low level. When the behavior detecting unit detects that the frequency of the movement of the object across the road within the unit time is less than the sixth threshold value and more than the seventh threshold value, that is, the object has a medium tendency to move across the road, the characteristic value correcting unit corrects the road crossing property to the middle level. Therefore, it is possible to correct the road crossing property, which is a characteristic value, according to the actual tendency of an object.

When the characteristic value correcting unit corrects the existence area to the central portion of the lane of the road, the direction change property to the low level, and the road crossing property to the low level, the type setting unit may set the object as the motorcycle. When the characteristic value correcting unit corrects the existence area to the side portion of the lane of the road, the direction change property to the middle level, and the road crossing property to the middle level, the type setting unit may set the object as the bicycle. When the characteristic value correcting unit corrects the existence area to the sidewalk, the direction change property to the high level, and the road crossing property to the high level, the type setting unit may set the object as the pedestrian.

When the object is the motorcycle, the motorcycle mainly travels through the central portion of the lane of the road. In addition, since the motorcycle travels at a relatively high speed, the direction change property is low. The motorcycle is less likely to travel across the road. According to this structure, when the actually detected behavior of the object has such tendencies, the type setting unit sets the object as the motorcycle. Therefore, it is possible to set the type of object with high accuracy.

When the object is the bicycle, the bicycle mainly travels through the side portion of the lane of the road and the sidewalk. Since the speed of the bicycle is lower than that of the motorcycle, the direction change property of the bicycle is a middle level. The bicycle is more likely to move across the road than the motorcycle. When the actually detected behavior of the object has such tendencies, the type setting unit sets the object as the bicycle. Therefore, it is possible to set the type of object with high accuracy.

When the object is the pedestrian, the pedestrian mainly walks the sidewalk. Since the speed of the pedestrian is low, the direction change property of the pedestrian is high. The pedestrian is more likely to move across the road. According to this structure, when the actually detected behavior of the object has such tendencies, the type setting unit sets the object as the pedestrian. Therefore, it is possible to set the type of object with high accuracy.

Advantageous Effects

According to the behavior predicting device of the above-mentioned aspect of the invention, it is possible to improve the accuracy of predicting the behavior of a motorcycle, a bicycle, and a pedestrian around a vehicle.

EXPLANATION OF REFERENCE

1: BEHAVIOR PREDICTING DEVICE
10: BEHAVIOR PREDICTING ECU
11: TYPE DETERMINING UNIT
12: CHARACTERISTIC VALUE TEMPORARY SETTING UNIT
13: BEHAVIOR DETECTING UNIT
14: CHARACTERISTIC VALUE CORRECTING UNIT
15: TYPE SETTING UNIT
16: BEHAVIOR PREDICTING UNIT
20: PERIPHERAL SENSOR
30: NAVIGATION DEVICE
40: COMMUNICATION DEVICE
50: DRIVING CONTROL PLAN GENERATING ECU

BEST MODE FOR CARRYING OUT THE INVENTION

Figure 1:
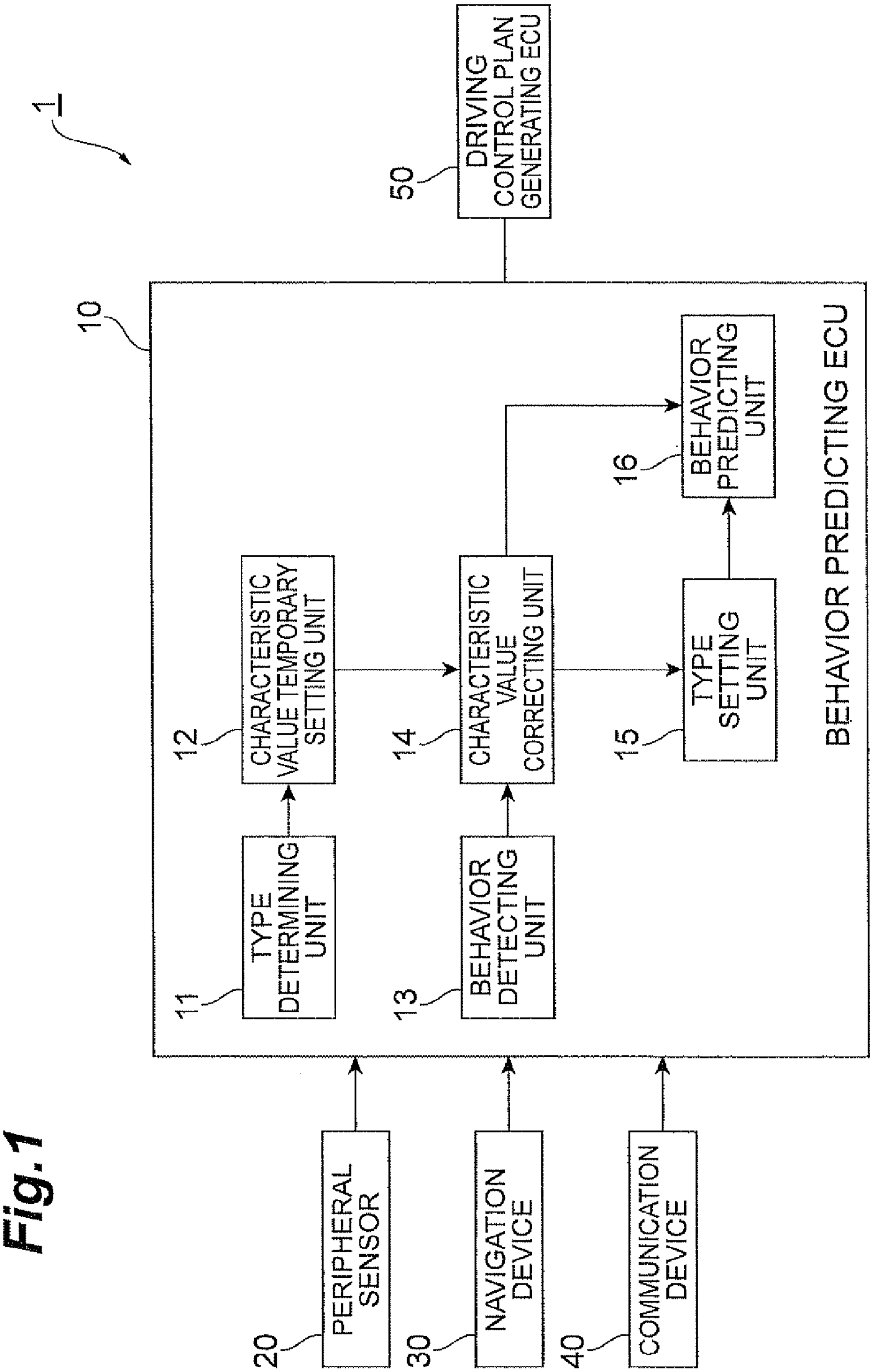
FIG. 1 is a block diagram illustrating the structure of a behavior predicting device according to an embodiment of the invention.

Hereinafter, a behavior predicting device according to an embodiment of the invention will be described with reference to the accompanying drawings. FIG. 1 is a block diagram illustrating the structure of the behavior predicting device according to the embodiment. A behavior predicting device 1 according to this embodiment is provided in a vehicle V that mainly travels on a road including a sidewalk W shown in FIG. 4, and is used to predict the behavior of, for example, a motorcycle M, a bicycle B, and a pedestrian P.

The behavior predicting device 1 includes a behavior predicting ECU (electronic control unit) 10. The behavior predicting ECU 10 is connected to a peripheral sensor 20, such as a radar or a camera, a navigation device 30 that acquires, for example, road information, and a communication device 40 for communication between vehicles or communication between the vehicle and the roadside. In addition, a driving control plan generating ECU 50 is connected to the behavior predicting ECU 10. The driving control plan generating ECU 50 generates the driving control plan of the vehicle V, and performs automatic driving control on the vehicle V on the basis of the plan, or provides the plan to the driver.

The behavior predicting ECU 10 includes a type determining unit 11, a characteristic value temporary setting unit 12, a behavior detecting unit 13, a characteristic value correcting unit 14, a type setting unit 15, and a behavior predicting unit 16.

The type determining unit 11 determines whether an object around the vehicle is a motorcycle, a bicycle, or a pedestrian using, for example, pattern recognition, on the basis of information acquired by the peripheral sensor 20, such as a radar or a camera, or information that is received from, for example, a road infrastructure sensor through the communication device 40. That is, the type determining unit 11 serves as a type determining unit described in the claims.

The characteristic value temporary setting unit 12 temporarily sets an existence area, a direction change property and a road crossing property, which are characteristic values of the object, on the basis of the type of object determined by the type determining unit 11, according to a predetermined rule, which will be described below. That is, the characteristic value temporary setting unit 12 serves as a characteristic value temporary setting unit described in the claims.

The behavior detecting unit 13 detects the behavior of an object on the basis of information acquired by the peripheral sensor 20, such as a radar or a camera, or information that is received from, for example, a road infrastructure sensor through the communication device 40, and detects an area in which a motorcycle, a bicycle, and a pedestrian actually exist, the frequency of change in direction, and the frequency of road crossing. That is, the behavior detecting unit 13 serves as a behavior detecting unit described in the claims.

The characteristic value correcting unit 14 corrects the characteristic values of the object temporarily set by the characteristic value temporary setting unit 12 on the basis of the behavior of the object detected by the behavior detecting unit 13 according to a predetermined rule, which will be described below. That is, the characteristic value correcting unit 14 serves as a characteristic value correcting unit described in the claims.

The type setting unit 15 sets whether the object is a motorcycle, a bicycle, or a pedestrian on the basis of the existence area, the direction change property, and the road crossing property, which are the characteristic values of the object corrected by the characteristic value correcting unit 14 according to a predetermined rule, which will be described below. That is, the type setting unit 15 serves as a type setting unit described in the claims.

The behavior predicting unit 16 predicts the behavior of the motorcycle, the bicycle, and the pedestrian on the basis of the existence area, the direction change property, and the road crossing property, which are the characteristic values of the object corrected by the characteristic value correcting unit 14, and the type of object set by the type setting unit 15. That is, the behavior predicting unit 16 serves as a behavior predicting unit described in the claims.

Figure 4:
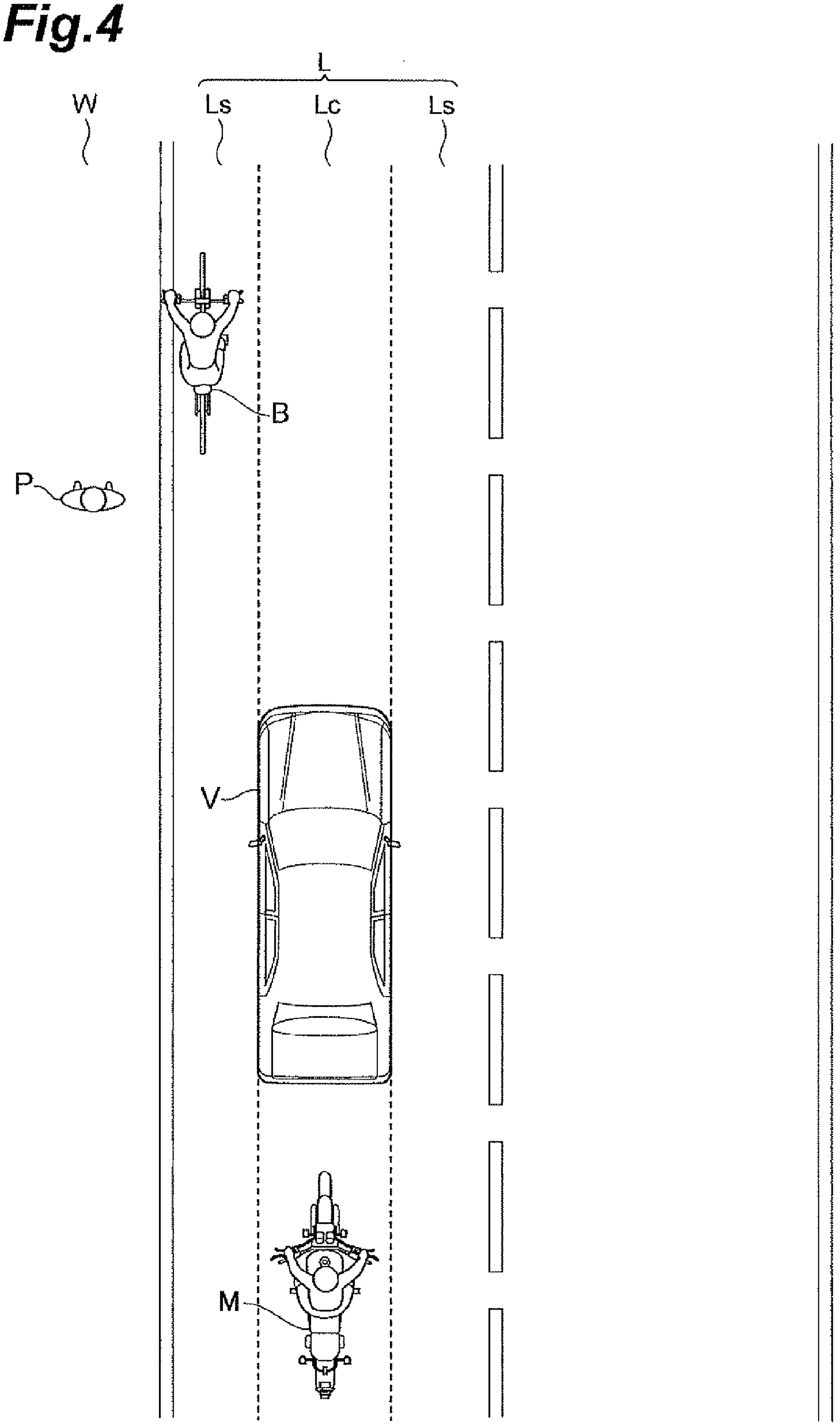
FIG. 4 is a diagram illustrating a basic scene of a behavior predicting operation of the behavior predicting device.

Hereinafter, the operation of the behavior predicting device according to this embodiment will be described. In the following description, as shown in FIG. 4, it is assumed that the vehicle V travels on the road on which there are the motorcycle M, the bicycle B, and the pedestrian P. The following process is performed by the behavior predicting ECU 10, and is repeated at a predetermined timing during the period from the turning-on to the turning-off of power.

Figure 2:
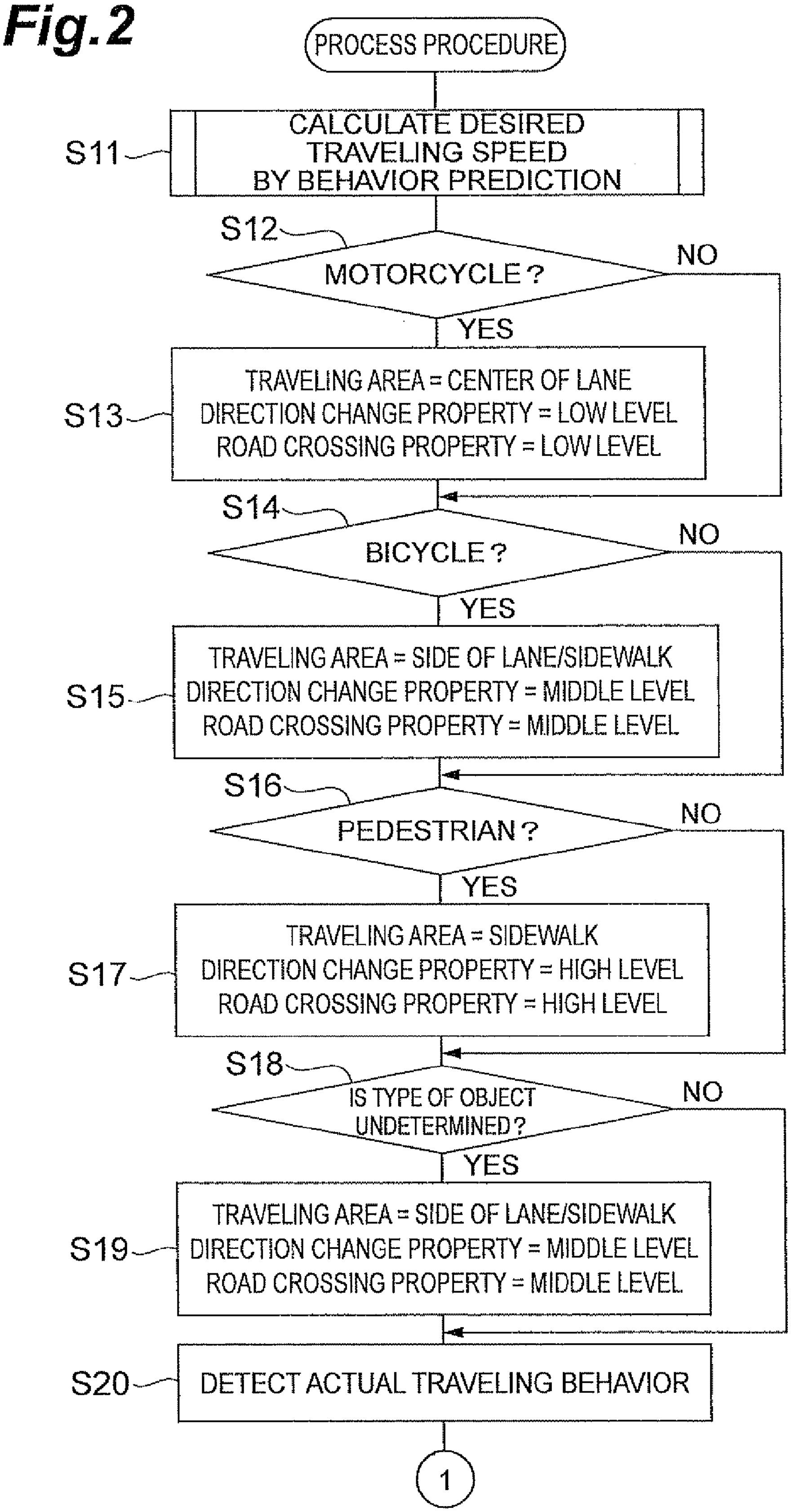
FIG. 2 is a flowchart illustrating a process of predicting the behavior of an object.
Figure 3:
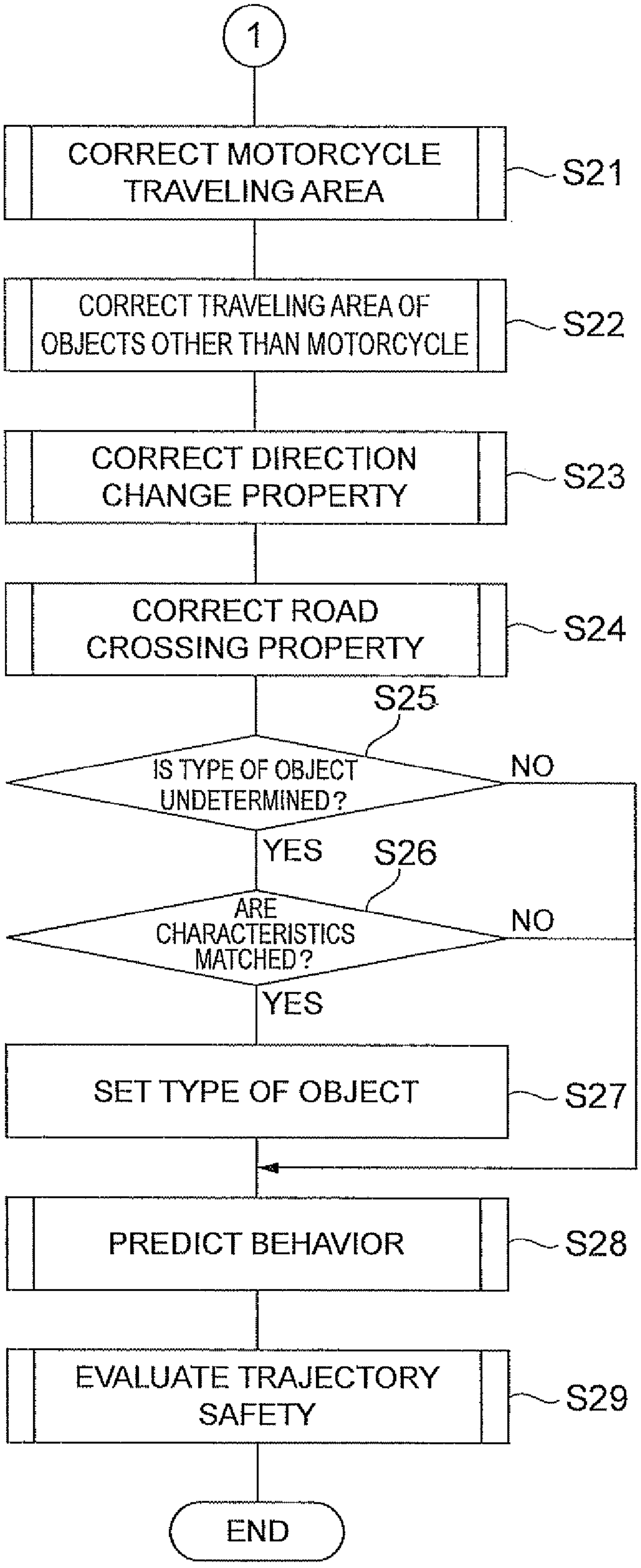
FIG. 3 is a flowchart illustrating the process of predicting the behavior of the object.

FIGS. 2 and 3 are flowcharts illustrating a process of predicting the behavior of an object. As shown in FIG. 2, the behavior predicting unit 16 estimates a desired traveling (movement) speed of the object (S11). In the estimation of the desired traveling speed, for example, first, the behavior predicting unit 16 generates an assumed traveling speed pattern corresponding to the road conditions of the motorcycle M, the bicycle B, and the pedestrian P, which are objects. Then, the behavior predicting unit 16 acquires the actual speed of the object on the basis of information acquired by the peripheral sensor 20, such as a radar or a camera, or information that is received from, for example, a road infrastructure sensor through the communication device 40. In addition, the behavior predicting unit 16 acquires the current road conditions from the navigation device 30. The behavior predicting unit 16 compares the assumed speed pattern corresponding to the current road conditions with the actual speed of the object, and learns the tendency of the traveling speed of the object. The behavior predicting unit 16 can estimate the desired traveling speed of the object on the basis of the learning result.

The type determining unit 11 determines whether an object around the vehicle is the motorcycle M, the bicycle B, or the pedestrian P using, for example, pattern recognition, on the basis of information acquired by the peripheral sensor 20, such as a radar or a camera, or information that is received from, for example, a road infrastructure sensor through the communication device 40 (S12, S14, and S16). The characteristic value temporary setting unit 12 temporarily sets the existence area (traveling area), the direction change property, and the road crossing property, which are the characteristic values of the object, on the basis of the type of object determined by the type determining unit 11, as follows (S13, S15, and S17).

When the type determining unit 11 determines that the object is the motorcycle M (S12), the characteristic value temporary setting unit 12 temporarily sets the existence area (traveling area) to a central portion Lc of the lane of the road, the direction change property to a low level, and the road crossing property to a low level (S13). When the type determining unit 11 determines that the object is the bicycle B (S14), the characteristic value temporary setting unit 12 temporarily sets the existence area (traveling area) to a side portion Ls of the lane of the road and a sidewalk W, the direction change property to a middle level, and the road crossing property to a middle level (S15). When the type determining unit 11 determines that the object is the pedestrian P (S16), the characteristic value temporary setting unit 12 temporarily sets the existence area (traveling area) to the sidewalk W, the direction change property to a high level, and the road crossing property to a high level (S17).

When it is difficult for the type determining unit 11 to determine whether the object is the motorcycle M, the bicycle B, or the pedestrian P, but the type determining unit 11 can determine whether the object is the motorcycle M, the bicycle B, or the pedestrian P on the basis of the size of the object detected by the peripheral sensor 20 (S18), the characteristic value temporary setting unit 12 temporarily sets the existence area (traveling area) to the side portion Ls of the lane of the road and the sidewalk W, the direction change property to the middle level, and the road crossing property to the middle level (S19).

The behavior detecting unit 13 detects the actual traveling behavior of the object on the basis of information acquired by the peripheral sensor 20, such as a radar or a camera, or information that is received from, for example, a road infrastructure sensor through the communication device 40 (S20).

As shown in FIG. 3, the behavior predicting ECU 10 performs the following learning correction process. When the type determining unit 11 determines that the object is the motorcycle M, the characteristic value correcting unit 14 performs the following learning correction process on the traveling area, which is a characteristic value (S21). When the behavior detecting unit 13 detects that the frequency of the traveling of the motorcycle M through the side portion Ls of the lane other than the central portion Lc of the lane of a road L shown in FIG. 4 is equal to or more than, for example, 70%, which is a predetermined percentage (first threshold value), the characteristic value correcting unit 14 corrects the traveling area to the central portion Lc and the side portion Ls of the lane, which are the entire area of the road L (S21). When the behavior detecting unit 13 detects that the frequency of the traveling of the motorcycle M through the side portion Ls of the lane of the road L is not equal to or more than, for example, 70%, which is a predetermined percentage, the characteristic value correcting unit 14 maintains the central portion Lc of the lane of the road to be the traveling area (S21).

When the type determining unit 11 determines that the objects are the bicycle B and the pedestrian P other than the motorcycle M, the characteristic value correcting unit 14 performs the following learning correction process on the traveling area, which is a characteristic value (S22). When the behavior detecting unit 13 detects that the frequency of the traveling of the bicycle B and the pedestrian P through the road L shown in FIG. 4 is equal to or more than, for example, 70%, which is a predetermined percentage (second threshold value), the characteristic value correcting unit 14 corrects the traveling area to only the road L (S22). When the behavior detecting unit 13 detects that the frequency of the traveling of the bicycle B and the pedestrian P through the road L is equal to or less than, for example, 30%, which is a predetermined percentage (third threshold value), the characteristic value correcting unit 14 corrects the traveling area to only the sidewalk W (S22). When the frequency of the traveling of the bicycle B and the pedestrian P through the road L is in the range of 30% to 70%, the characteristic value correcting unit 14 corrects the traveling area to the road L and the sidewalk W (S22).

The characteristic value correcting unit 14 corrects and updates the direction change property, which is a characteristic value, as follows (S23). When the behavior detecting unit 13 detects that the probability that the motorcycle M, the bicycle B, and the pedestrian P, which are objects, will maintain their traveling directions within a unit time (for example, one minute) is, for example, 90%, which is a predetermined value (fourth threshold value), or more, the characteristic value correcting unit 14 corrects the direction change property to a low level (S23). When the behavior detecting unit 13 detects that the probability that the objects will maintain their traveling directions within the unit time is, for example, 50%, which is a predetermined value (fifth threshold value), or less, the characteristic value correcting unit 14 corrects the direction change property to a high level (S23). When the behavior detecting unit 13 detects that the probability that the objects will maintain their traveling directions within the unit time is, for example, in the range of 50% to 90% other than the above-mentioned ranges, the characteristic value correcting unit 14 corrects the direction change property to a middle level (S23).

The characteristic value correcting unit 14 corrects and updates the road crossing property, which is a characteristic value, as follows (S24). When the behavior detecting unit 13 detects that the motorcycle M, the bicycle B, and the pedestrian P travel through only the road W, the characteristic value correcting unit 14 corrects the road crossing property to a low level (S24). When the behavior detecting unit 13 detects that the frequency of the movement of the object across the road within a unit time (for example, one minute) is, for example, 90%, which is a predetermined value (sixth threshold value), or more, the characteristic value correcting unit 14 corrects the road crossing property to a high level (S24). When the behavior detecting unit 13 detects that the frequency of the movement of the object across the road within the unit time is, for example, 50%, which is a predetermined value (seventh threshold value), or less, the characteristic value correcting unit 14 corrects the road crossing property to a low level (S24). When the behavior detecting unit 13 detects that the frequency of the movement of the object across the road within the unit time is the range of 50% to 90% other than the above-mentioned ranges, the characteristic value correcting unit 14 corrects the road crossing property to a middle level (S24).

When it is impossible for the type determining unit 11 to determine whether the object is the motorcycle M, the bicycle B, or the pedestrian P in Steps S12, S14, and S16 (S25) and the characteristic values obtained by the behavior detecting unit 13 and the characteristic value correcting unit 14 are equal to the temporarily set characteristic values of the motorcycle M, the bicycle B, and the pedestrian P as follows (S26), the type setting unit 15 sets the type of object (S27).

That is, among the characteristic values of the object obtained by the behavior detecting unit 13 and the characteristic value correcting unit 14, when the existence area (traveling area) is the central portion Lc of the lane of the road L, the direction change property is a low level, and the road crossing property is a low level, the type setting unit 15 sets the object as the motorcycle M (S27).

Among the characteristic values of the objects obtained by the behavior detecting unit 13 and the characteristic value correcting unit 14, when the existence area (traveling area) is the side portion Ls of the lane of the road L, the direction change property is a middle level, and the road crossing property is a middle level, the type setting unit 15 sets the object as the bicycle B (S27).

Among the characteristic values of the objects obtained by the behavior detecting unit 13 and the characteristic value correcting unit 14, when the existence area (traveling area) is the sidewalk W, the direction change property is a high level, and the road crossing property is a high level, the type setting unit 15 sets the object as the pedestrian P (S27).

When the type determining unit 11 can determine whether the object is the motorcycle M, the bicycle B, or the pedestrian P in Steps S12, S14, and S16, the type setting unit 15 sets the type of object determined by the type determining unit 11.

The behavior predicting unit 16 predicts the behavior of the motorcycle M, the bicycle B, and the pedestrian P on the basis of the existence area (traveling area), the direction change property, and the road crossing property, which are the characteristic values of the objects corrected by the characteristic value correcting unit 14, and the type of object set by the type setting unit 15 (S28). Specifically, the behavior predicting unit 16 increases the probability that the object will exist in the traveling area corrected by the characteristic value correcting unit 14. In addition, the behavior predicting unit 16 estimates the course distribution of the object that is more likely to change its direction according to the direction change property corrected by the characteristic value correcting unit 14. For example, when the direction change property is 10%, the behavior predicting unit 16 estimates the course distribution of the object on the assumption that the probability that the object will change its direction is 10%. Further, the behavior predicting unit 16 estimates the course distribution of the object that is more likely to move across the road according to the road crossing property corrected by the characteristic value correcting unit 14.

Figure 5:
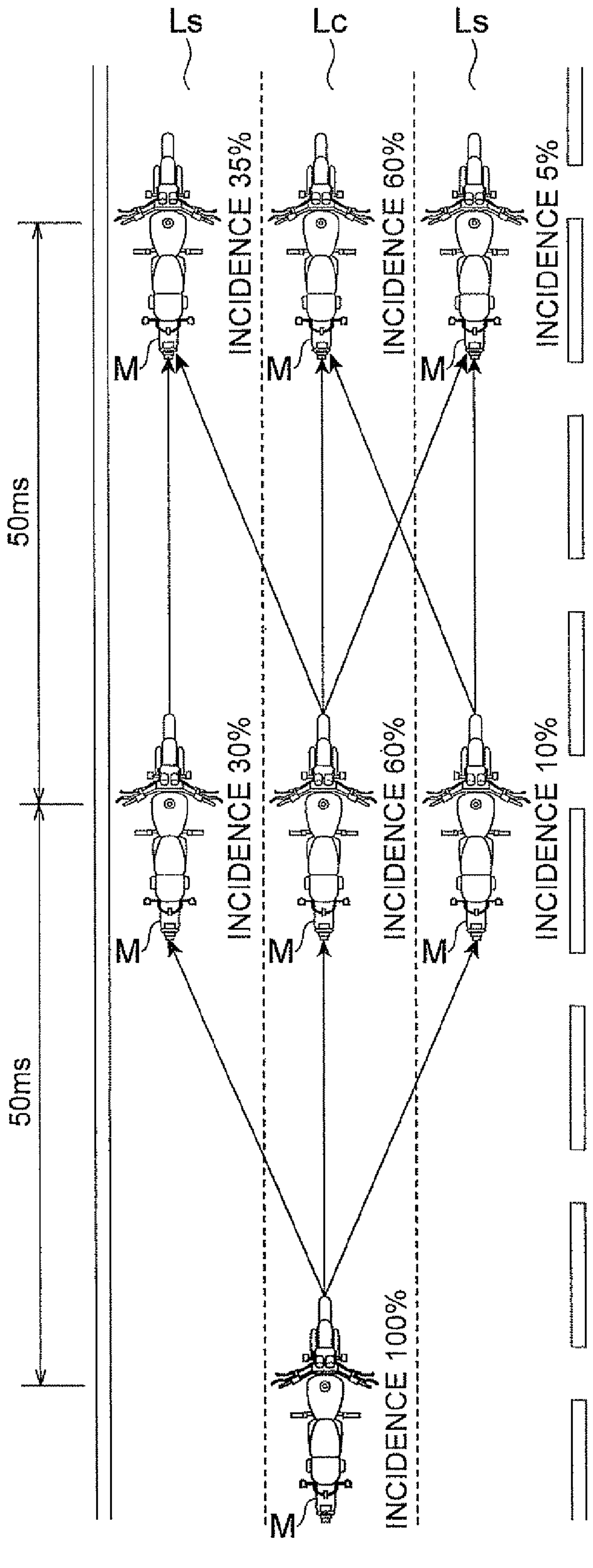
FIG. 5 is a diagram illustrating a detailed example of the behavior predicting operation.

The behavior predicting unit 16 predicts the behavior of the object on the basis of the type of object set by the type setting unit 15. In general, it is highly unlikely the pedestrian P will move at a speed of 50 km/h or more. Therefore, for example, when the object is the pedestrian P, the behavior predicting unit 16 predicts the behavior of the object to be other than the possibility that the pedestrian P will move at a speed of 50 km/h or more. In this way, for example, the behavior predicting unit 16 can predict the behavior of the motorcycle M and the incidence thereof at an interval of 50 ms as shown in FIG. 5.

The driving control plan generating ECU 50 generates a plan to control the driving of the vehicle V on the basis of the behavior of the object predicted by the behavior predicting unit 16. In this case, the driving control plan generating ECU 50 evaluates the safety of the trajectory of the vehicle V including the motorcycle M, the bicycle B, and the pedestrian P (S29).

According to this embodiment, the type determining unit 11 determines whether an object around the vehicle V is the motorcycle M, the bicycle B, or the pedestrian P, and the characteristic value temporary setting unit 12 temporarily sets the characteristic values of the object on the basis of the type of object determined by the type determining unit 11. Therefore, it is possible to provisionally determine the characteristic values of an object on the basis of the type of object.

The behavior detecting unit 13 detects the behavior of the object, and the characteristic value correcting unit 14 corrects the characteristic values of the object temporarily set by the temporary setting unit 12 on the basis of the behavior of the object detected by the behavior detecting unit 13. Therefore, it is possible to correct the characteristic values provisionally determined on the basis of the actual behavior of an object and thus improve the accuracy of the characteristic values of the object.

The type setting unit 15 sets whether the object is the motorcycle M, the bicycle B, or the pedestrian P on the basis of the characteristic values of the object corrected by the characteristic value correcting unit 14. Therefore, it is possible to improve the accuracy of the determination of the type of object.

The behavior predicting unit 16 predicts the behavior of the object on the basis of the characteristic values of the object corrected by the characteristic value correcting unit 14 and the type of object set by the type setting unit 15. Therefore, it is possible to improve the accuracy of the prediction of behavior by predicting the behavior of an object on the basis of the characteristic values of the object corrected on the basis of the actual behavior of the object and the type of object.

According to this embodiment, the characteristic values of an object, which is any one of the motorcycle M, the bicycle B, and the pedestrian P, include the existence area, the direction change property, and the road crossing property, which are important factors for ensuring safety. Therefore, the value of the prediction of behavior based on the characteristic values is improved.

According to this embodiment, the characteristic value temporary setting unit 12 temporarily sets the existence area, the direction change property, and the road crossing property in stages. Therefore, it is possible to temporarily set the characteristic values using a simple method.

In this case, when the object is the motorcycle M, the motorcycle M mainly travels through the central portion Lc of the lane of the road L. Since the motorcycle M travels at a relatively high speed, the direction change property is low. In addition, the motorcycle M is less likely to travel across the road. Therefore, the characteristic value temporary setting unit 12 temporarily sets the existence area to the central portion Lc of the lane of the road L, the direction change property to a low level, and the road crossing property to a low level.

When the object is the bicycle B, the bicycle B mainly travels through the side portion Ls of the lane of the road L and the sidewalk W. Since the speed of the bicycle B is lower than that of the motorcycle M, the direction change property of the bicycle is a middle level. In addition, the bicycle B is more likely to move across the road than the motorcycle M. Therefore, the characteristic value temporary setting unit 12 temporarily sets the existence area to the side portion Ls of the lane of the road L and the sidewalk P, the direction change property to a middle level, and the road crossing property to a middle level.

When the object is the pedestrian P, the pedestrian P mainly walks the sidewalk W. Since the speed of the pedestrian P is low, the direction change property of the pedestrian is high. In addition, the pedestrian P is more likely to move across the road. Therefore, the characteristic value temporary setting unit temporarily sets the existence area to the sidewalk P, the direction change property to a high level, and the road crossing property to a high level.

In this way, the characteristic value temporary setting unit 12 can temporarily set characteristic values suitable for the determined type of object.

Here, the traveling tendency of the motorcycle M is divided into two cases, that is, a case in which the driver tends to drive the motorcycle through the central portion Lc of the lane of the road L and a case in which the driver tends to drive the motorcycle through the side portion Ls of the lane of the road L. According to this structure, when the type determining unit 11 determines that the object is the motorcycle M and the behavior detecting 13 detects that the motorcycle M frequently travels through the side portion Ls of the lane, the characteristic value correcting unit 14 corrects the existence area to the central portion Lc and the side portion Ls of the lane of the road L. Therefore, it is possible to correct the existence area, which is a characteristic value, according to the actual tendency of the motorcycle M.

Alternatively, the tendency of the bicycle B or the pedestrian P is divided into two cases, that is, a case in which the bicycle B or the pedestrian P tends to be disposed on the road L and a case in which it tends to be disposed on the sidewalk W according the situation, such as crossing, or road conditions. However, according to this embodiment, when the type determining unit 11 determines that the object is the bicycle B or the pedestrian P and the behavior detecting unit 13 detects that the bicycle B or the pedestrian P exists frequently on the road L, the characteristic value correcting unit 14 corrects the existence area to the road L. When the behavior detecting unit 13 detects that the bicycle B or the pedestrian P exists less frequently on the road L, the characteristic value correcting unit 14 corrects the existence area to the sidewalk W. When the behavior detecting unit 13 detects that the frequency of the existence of the bicycle B or the pedestrian P on the road L is a middle level, the characteristic value correcting unit 14 corrects the existence area to the road L and the sidewalk W. Therefore, it is possible to correct the existence area, which is a characteristic value, according to the actual tendency of the bicycle B or the pedestrian P.

When the behavior detecting unit 13 detects that the object changes its direction less frequently, the characteristic value correcting unit 14 corrects the direction change property to a low level. When the behavior detecting unit 13 detects that the object frequently changes its direction, the characteristic value correcting unit 14 corrects the direction change property to a high level. When the behavior detecting unit 13 detects that the frequency of change in the direction of the object is a middle level, the characteristic value correcting unit 14 corrects the direction change property to a high level. Therefore, it is possible to correct the direction change property, which is a characteristic value, according to the actual tendency of an object.

In this embodiment, when the behavior detecting unit 13 detects that there is an object on only the road L, the characteristic value correcting unit 14 corrects the road crossing property to a low level. When the behavior detecting unit 13 detects that the object is more likely to move across the road, the characteristic value correcting unit 14 corrects the road crossing property to a high level. When the behavior detecting unit 13 detects that the object is less likely to move across the road, the characteristic value correcting unit 14 corrects the road crossing property to a low level. When the behavior detecting unit 13 detects that the object has a medium tendency to move across the road, the characteristic value correcting unit 14 corrects the road crossing property to a middle level. Therefore, it is possible to correct the road crossing property, which is a characteristic value, according to the actual tendency of an object.

In this case, when the object is the motorcycle M, the motorcycle M mainly travels through the central portion Lc of the lane of the road L. Since the motorcycle M travels at a relatively high speed, the direction change property is low. In addition, the motorcycle M is less likely to travel across the road. According to this structure, when the actually detected behavior of the object has such a tendency, the type setting unit 15 sets the object as the motorcycle M. Therefore, it is possible to set the type of object with high accuracy.

When the object is the bicycle B, the bicycle B mainly travels through the side portion Ls of the lane of the road L and the sidewalk W. Since the speed of the bicycle B is lower than that of the motorcycle M, the direction change property of the bicycle is a middle level. In addition, the bicycle B is more likely to move across the road than the motorcycle M. When the actually detected behavior of the object has such a tendency, the type setting unit 15 sets the object as the bicycle B. Therefore, it is possible to set the type of object with high accuracy.

When the object is the pedestrian P, the pedestrian P mainly walks the sidewalk W. Since the speed of the pedestrian P is low, the direction change property of the pedestrian is high. In addition, the pedestrian P is more likely to move across the road. According to this structure, when the actually detected behavior of the object has such a tendency, the type setting unit 15 sets the object as the pedestrian P. Therefore, it is possible to set the type of object with high accuracy.

Although the embodiment of the invention has been described above, the invention is not limited thereto, but various modifications and changes can be made.

Industrial Applicability

It is possible to improve the accuracy of predicting the behavior of a motorcycle, a bicycle, and a pedestrian existing around a vehicle.

The invention claimed is:

1. A behavior predicting device that is connected to a sensor and a communication device, the behavior predicting device comprising:

a type determining unit that determines whether an object around a vehicle is a motorcycle, a bicycle, or a pedestrian based on information received from the communication device;

a characteristic value temporary setting unit that temporarily sets characteristic values of the object on the basis of the type of object determined by the type determining unit;

a behavior detecting unit that detects the behavior of the object;

a characteristic value correcting unit that corrects the characteristic values of the object temporarily set by the characteristic value temporary setting unit on the basis of the behavior of the object detected by the behavior detecting unit;

a type setting unit that sets whether the object is the motorcycle, the bicycle, or the pedestrian on the basis of the characteristic values of the object corrected by the characteristic value correcting unit; and a behavior predicting unit that predicts the behavior of the object on the basis of the type of object set by the type setting unit, wherein:

the characteristic values of the object include an area in which the object exists on a road, a direction change property indicating the possibility that the object will change its direction, and a road crossing property indicating the possibility that the object will move across the road, the characteristic value temporary setting unit temporarily sets the existence area to at least one of three areas, that is, a central portion of a lane of the road, a side portion of the lane of the road, and a sidewalk, the characteristic value temporary setting unit temporarily sets the direction change property to at least one of three levels, that is, a high level, a middle level, and a low level, the characteristic value temporary setting unit temporarily sets the road crossing property to at least one of three levels, that is, a high level, a middle level, and a low level, when the type determining unit determines that the object is the motorcycle, the characteristic value temporary setting unit temporarily sets the existence area to the central portion of the lane of the road, the direction change property to the low level, and the road crossing property to the low level, when the type determining unit determines that the object is the bicycle, the characteristic value temporary setting unit temporarily sets the existence area to the side portion of the lane of the road and the sidewalk, the direction change property to the middle level, and the road crossing property to the middle level, and when the type determining unit determines that the object is the pedestrian, the characteristic value temporary setting unit temporarily sets the existence area to the sidewalk, the direction change property to the high level, and the road crossing property to the high level.

2. The behavior predicting device according to claim 1, wherein, when the type determining unit determines that the object is the motorcycle and the behavior detecting unit detects that the frequency of the existence of the object in the side portion of the lane of the road is more than a first threshold value, the characteristic value correcting unit corrects the existence area to the central portion and the side portion of the lane of the road.

3. The behavior predicting device according to claim 1, wherein, in a case in which the type determining unit determines that the object is the bicycle or the pedestrian, when the behavior detecting unit detects that the frequency of the existence of the object on the road is equal to or more than a second threshold value, the characteristic value correcting unit corrects the existence area to the road, when the behavior detecting unit detects that the frequency of the existence of the object on the road is equal to or less than a third threshold value less than the second threshold value, the characteristic value correcting unit corrects the existence area to the sidewalk, and when the behavior detecting unit detects that the frequency of the existence of the object on the road is less than the second threshold value and more than the third threshold value, the characteristic value correcting unit corrects the existence area to the road and the sidewalk.

4. The behavior predicting device according to claim 1, wherein, when the behavior detecting unit detects that the frequency of the maintenance of the traveling direction of the object within a unit time is equal to or more than a fourth threshold value, the characteristic value correcting unit corrects the direction change property to the low level, when the behavior detecting unit detects that the frequency of the maintenance of the traveling direction of the object within the unit time is equal to or less than a fifth threshold value less than the fourth threshold value, the characteristic value correcting unit corrects the direction change property to the high level, and when the behavior detecting unit detects that the frequency of the maintenance of the traveling direction of the object within the unit time is less than the fourth threshold value and more than the fifth threshold value, the characteristic value correcting unit corrects the direction change property to the middle level.

5. The behavior predicting device according to claim 1, wherein, when the behavior detecting unit detects that the object exists on only the road, the characteristic value correcting unit corrects the road crossing property to the low level, when the behavior detecting unit detects that the frequency of the movement of the object across the road within a unit time is equal to or more than a sixth threshold value, the characteristic value correcting unit corrects the road crossing property to the high level, when the behavior detecting unit detects that the frequency of the movement of the object across the road within the unit time is equal to or less than a seventh threshold value less than the sixth threshold value, the characteristic value correcting unit corrects the road crossing property to the low level, and when the behavior detecting unit detects that the frequency of the movement of the object across the road within the unit time is less than the sixth threshold value and more than the seventh threshold value, the characteristic value correcting unit corrects the road crossing property to the middle level.

6. The behavior predicting device according to claim 1, wherein, when the characteristic value correcting unit corrects the existence area to the central portion of the lane of the road, the direction change property to the low level, and the road crossing property to the low level, the type setting unit sets the object as the motorcycle, when the characteristic value correcting unit corrects the existence area to the side portion of the lane of the road, the direction change property to the middle level, and the road crossing property to the middle level, the type setting unit sets the object as the bicycle, and when the characteristic value correcting unit corrects the existence area to the sidewalk, the direction change property to the high level, and the road crossing property to the high level, the type setting unit sets the object as the pedestrian.

7. The behavior predicting device according to claim 1, wherein the behavior predicting unit predicts the behavior of the object on the basis of the characteristic values of the object corrected by the characteristic value correcting unit.

* * * * *